(12) United States Patent
Aregger et al.

(10) Patent No.: US 7,871,528 B2
(45) Date of Patent: Jan. 18, 2011

(54) WATER FILTER

(75) Inventors: Beat Aregger, Udligenswil (CH); Ruedi Gasser, Bürglen (CH)

(73) Assignee: elfo AG, Sachseln (CH)

( * ) Notice: Subject to any disclaimer, the term of this patent is extended or adjusted under 35 U.S.C. 154(b) by 505 days.

(21) Appl. No.: 11/686,405

(22) Filed: Mar. 15, 2007

(65) Prior Publication Data
US 2007/0221570 A1 Sep. 27, 2007

(30) Foreign Application Priority Data
Mar. 21, 2006 (DE) ........................ 10 2006 013 261

(51) Int. Cl.
*C02F 1/28* (2006.01)
*B01D 24/10* (2006.01)
(52) U.S. Cl. .................. 210/807; 210/282; 210/283; 210/284; 210/286; 210/289; 210/291
(58) Field of Classification Search ................. 210/263, 210/282, 284, 285, 286, 289, 291, 449, 456, 210/283, 807
See application file for complete search history.

(56) References Cited

U.S. PATENT DOCUMENTS

| | | | | |
|---|---|---|---|---|
| 385,440 A | * | 7/1888 | Birkery | 210/287 |
| 1,781,314 A | * | 11/1930 | Brandt | 210/243 |
| 1,993,142 A | | 3/1935 | Johnson | |
| 2,037,332 A | | 4/1936 | Lieberman | |
| 2,335,456 A | | 6/1941 | Seitz | |
| RE32,089 E | * | 3/1986 | Blatt et al. | 210/651 |
| 4,861,476 A | * | 8/1989 | Kohlheb et al. | 210/321.76 |
| 5,116,500 A | * | 5/1992 | Ceaton | 210/238 |

FOREIGN PATENT DOCUMENTS

DE 38 28 008 3/1990
EP 0 054 082 6/1982

OTHER PUBLICATIONS

German Search Report for corresponding Application No. 10 2006 013 261.0-27 dated Nov. 16, 2006.

* cited by examiner

*Primary Examiner*—Matthew O Savage
(74) *Attorney, Agent, or Firm*—Renner, Otto, Boisselle & Sklar, LLP

(57) ABSTRACT

The water filter including a container, which has a bottom and a cover, wherein several inlets are provided on the border of the cover and an outlet is provided in the centre of the bottom. A spiral channel is located in the container, through which the inlets are connected to the outlet.

11 Claims, 6 Drawing Sheets

WATER FILTER

TECHNICAL FIELD

The invention relates to a water filter for cleaning and conditioning water, particularly drinking water.

With the help of the water filter, the liquid flowed in, such as for example drinking water, can be de-mineralised and de-carbonated and fine particles can be filtered out.

BACKGROUND OF THE INVENTION

A device for cleaning the water is known from the European Patent EP 0 054 082 B1 and such device has a container filled with cleaning agent. A dividing wall, through which the water is led on a spiral track from the inlet to the outlet, is provided in the container.

SUMMARY OF THE INVENTION

An object of the invention is to indicate a water filter, with which a large amount of water can be filtered in a short period of time and furthermore the filtration occurs with high quality.

Moreover, the operating characteristics of the water filter, for example the transit time, should be kept constant over a longer period of time.

The water filter according to the invention includes a container, which has a bottom and a cover, wherein several inlets are provided in the cover and an outlet is provided in the bottom. A spiral channel is located in the container, through which the inlets are connected to the outlet.

Advantageous further developments of the invention result from the characteristics stated in the dependent patent claims.

Several spiral channels are provided in an embodiment of the water filter according to the invention. Thus can reduce the residence time of the water to be filtered in the water filter and increase the throughput.

In another embodiment of the water filter according to the invention each of the channels connects respectively one of the inlets with the outlet. This helps in achieving that the channels are always supplied evenly with water via the inlets.

In another embodiment of the water filter according to the invention each of the channels connects respectively one of the inlets to respectively one of the outlets. This helps in achieving that the channels are always supplied evenly with water via the inlets and the transit time of the water is reduced.

In an additional embodiment of the water filter according to the invention granulated filter material is located into the water filter.

In addition one or more ribs can be provided between the channel walls in the water filter according to the invention. This has the advantage that the granulated filter material is prevented from getting washed away by the flow of the water and from accumulating near the outlet. In particular if the granulated filter material becomes wet, it can swell up. If the filter material has accumulated across the entire cross-section of the channel and swells up, the density raises in this area and the flow resistance increases. The ribs ensure an even distribution of the granulated filter material over the operating time of the water filter. Thereby the transit time remains constant over a long period of time and the clogging of the channel or the channels, as the case may be, is avoided.

It is further recommended for solving the object of the invention that, in the case of the water filter according to the invention, the inlets and the outlet have respectively one sieve for retaining the filter material. Thereby the filter material can be poured directly into the channel or the channels, as the case may be, as bulk material. An additional covering of the filter material is not necessary.

According to another characteristic of the invention the inlets can be distributed equidistant in the water filter. This ensures that irrespective of the mounting position, that is to say of the orientation of the water filter in the equipment, a sufficient water supply to the water filter is always ensured.

In a further development of the water filter according to the invention, the sieve is arranged in the outlet and moulded on at the bottom. The moulding-on can be carried out by injection, pressing in or encasing.

The inlets can be arranged on the border of the cover in the case of the water filter according to the invention.

In an additional further development of the water filter according to the invention the bottom has a slope. This helps in achieving that at the end of the filtering process the remaining water flows from the water filter. Moreover, thanks to the slope in the bottom, the flow speed of the water is increased so that the throughput also increases.

In a further development of the water filter according to the invention the cover is flat. This enables a small and compact design of the water filter.

According to another characteristic of the invention, the cover can be moulded-on on the container in the case of the water filter. The moulding-on can be carried out by welding, injecting or similar methods. This ensures, in a simple way, that the granulated filter material cannot fall out due to an inadvertent opening of the water filter.

In another embodiment, the container of the water filter according to the invention is cylindrically shaped.

Finally the water filter according to the invention can be used in a household appliance, particularly in a coffee maker, tea machine or soft drink maker, a juice extractor, a laundry iron, a dishwasher, a washing machine or a water purification apparatus. The water filter according to the invention can also be used in a free-standing water dispenser or a water dispenser, which is part of a refrigerator. The water filter can also be connected to a water pipe. Moreover, the water filter can also be used in a humidifier or an air purifier.

BRIEF DESCRIPTION OF THE DRAWINGS

These and other aspects of the invention are apparent from and will be elucidated in details with reference to several embodiments with the help of 9 figures described hereinafter.

DETAILED DESCRIPTION OF THE INVENTION

Figure 1:
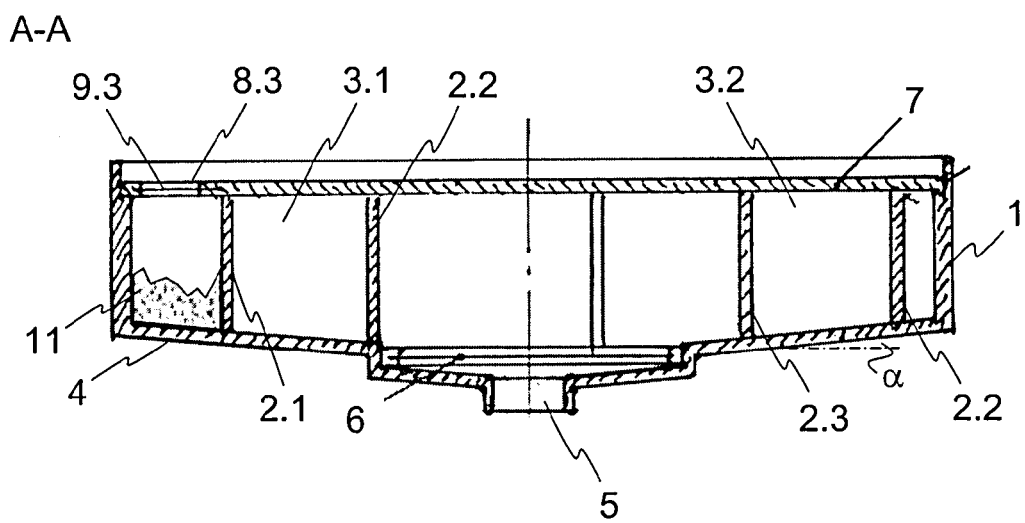
FIG. 1 shows a first embodiment of the water filter according to the invention in the cross-section.
Figure 2:
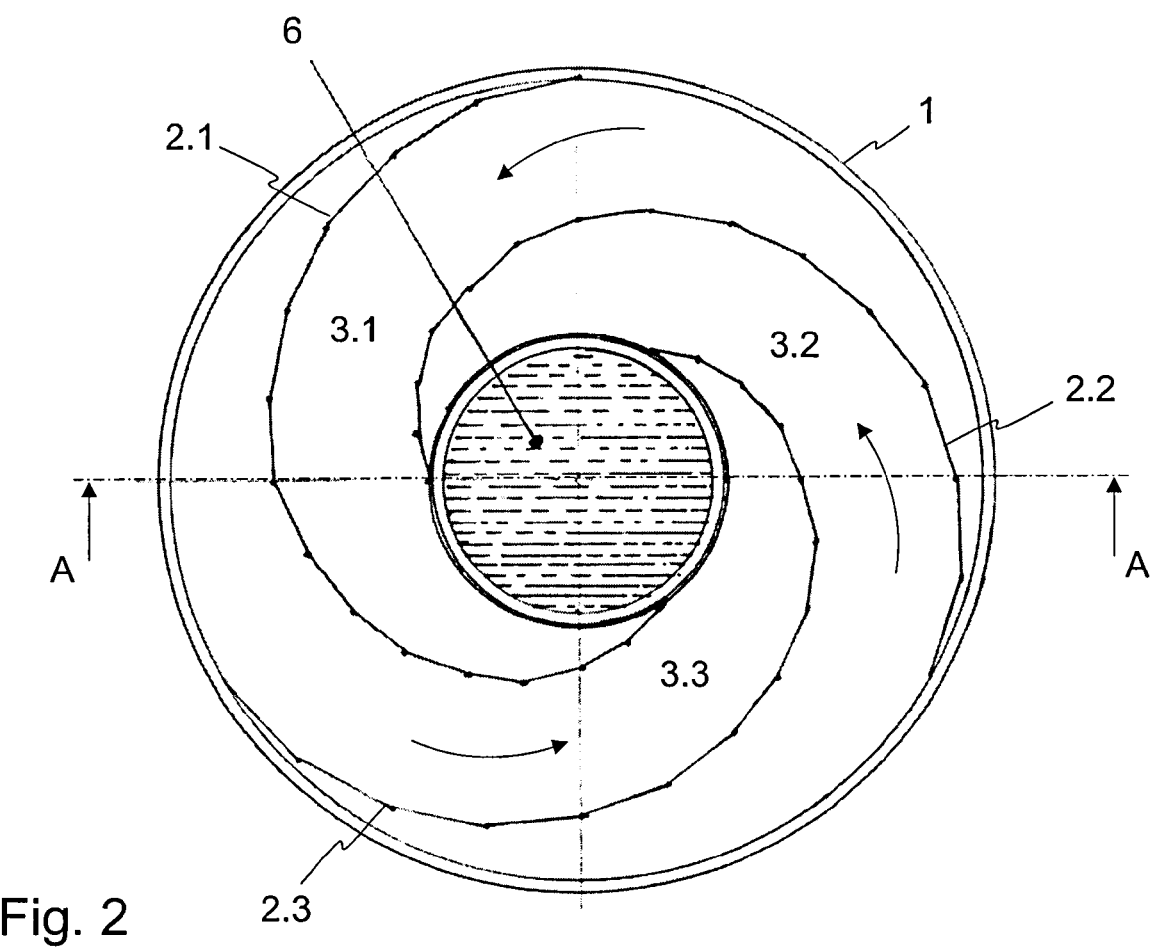
FIG. 2 shows the first embodiment of the water filter according to the invention in the top view in opened state.
Figure 3:
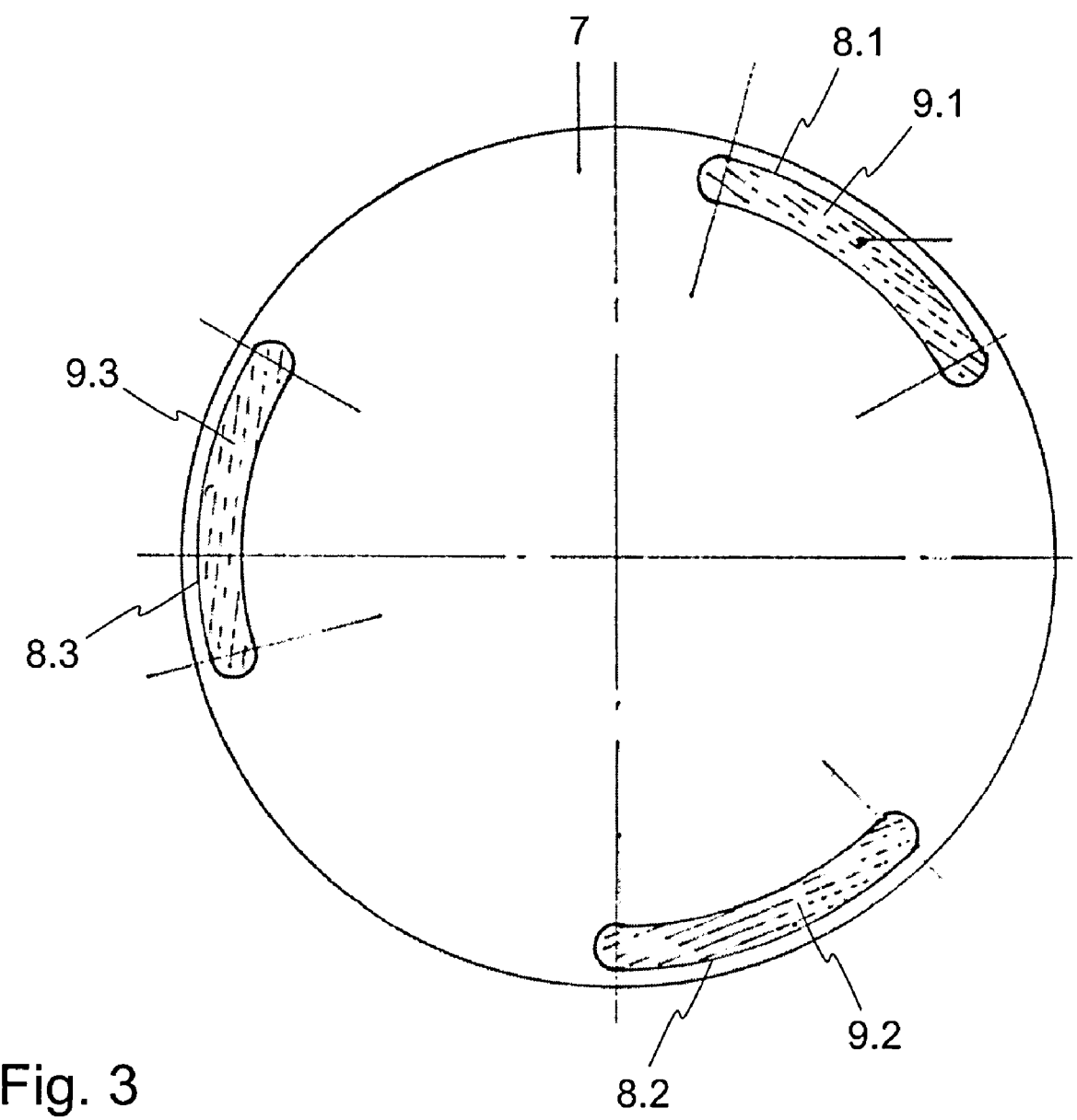
FIG. 3 shows the first embodiment of the water filter according to the invention in the top view with cover.

FIGS. 1 and 2 show a first embodiment of the water filter according to the invention in the cross-section and in the top view in opened state. The cross-section shown in FIG. 1 is a cut along the cutting line A-A, which is shown in FIG. 2. The water filter includes a cylindrical container 1, in which three spirally running channel walls 2.1, 2.2 and 2.3 are arranged. The channel walls 2.1, 2.2 and 2.3 form, with the bottom 4 and the cover 7 of the container 1, three spiral channels 3.1, 3.2 and 3.3. Granulated filter material 11 is located in the channels 3.1, 3.2 and 3.3, wherein the filling of the channels 3.1, 3.2 and 3.3 is shown in FIG. 1 only as example. As shown in FIG. 3, there are three inlets 8.1, 8.2 and 8.3 in the cover 7. The water to be filtered is led via the first inlet 8.1 into the first channel 3.1, via the second inlet 8.2 into the second channel 3.2 and via the third inlet 8.3 into the third channel 3.3 and from there through the granulate filter material 11 in the direction of an outlet 5 located in the bottom 4.

The container 1 can be made from an injection-mouldable synthetic material. The channel walls 2.1, 2.2 and 2.3 are, in the case of the first embodiment, moulded-on on the bottom 4 and the outer wall of the container 1. This gives a high stability. Instead, it is however also possible to mould-on the channel walls 2.1, 2.2 and 2.3 on the cover 7.

A sieve 6 is located in the bottom 4 in the outlet 5 in order to retain the granulated filter material 11. For the same purpose one sieve 9.1, 9.2 and 9.3 is also respectively located in the inlets 8.1, 8.2 and 8.3 of the cover 7. The mesh aperture of the sieves 6, 9.1, 9.2 and 9.3 is adjusted to the grain size of the filter material 11 and is preferably situated in the range from 0.1 mm to 0.4 mm. The sieves can also have holes with openings in the range from 0.1 mm to 0.4 mm instead of meshes. The sieves 6, 9.1, 9.2 and 9.3 can be pressed in or moulded on. The sieves 6, 9.1, 9.2 and 9.3 can also be designed as tissue or fleece.

Preferably, the channels 3.1, 3.2 and 3.3 are evenly filled up with the filter material 11 to a defined filling height. Because the filter material 11 can swell up in the wet state, the channels 3.1, 3.2 and 3.3 are not fully filled with the filter material 11. If the channels 3.1, 3.2 and 3.3 would be completely filled with the filter material 11, the density and with it also the flow resistance would also increase, if the filter material 11 swells up, so that then the water would flow more slowly through the channels 3.1, 3.2 and 3.3.

The conditioning of the water takes place with the help of the granulated or granular filter material 11. A mixture made from ion exchangers and activated carbon can be used as filter material 11 in the case of the water filter according to the invention.

In the case of the first embodiment of the water filter according to the invention, the bottom 4 of the container 1 has a slope with an angle α, which is preferably situated in the range from 1° to 10°. This helps in achieving that towards the end of the filtering process the remaining water flows out from the water filter. Moreover, through the slope in the bottom 4, the flow speed of the water is increased, so that the throughput also increases.

Figure 4:
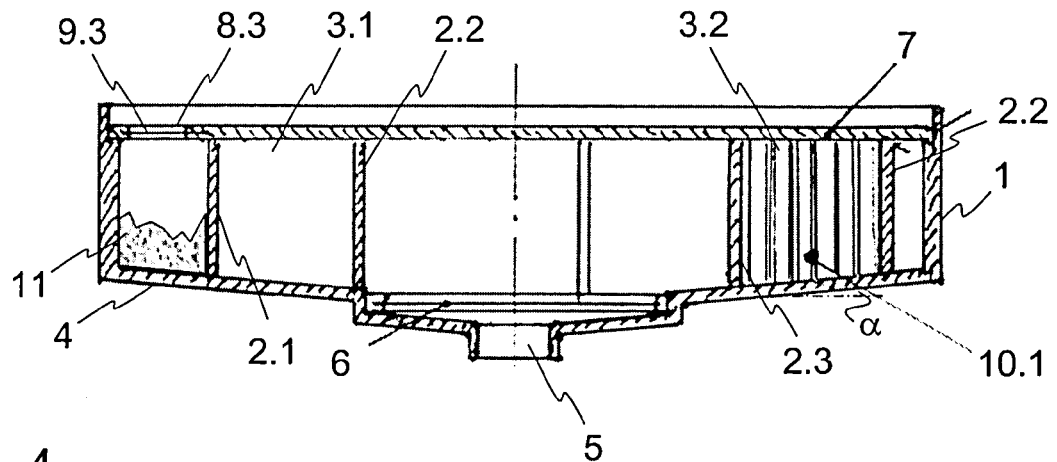
FIG. 4 shows a second embodiment of the water filter according to the invention in the cross-section.
Figure 5:
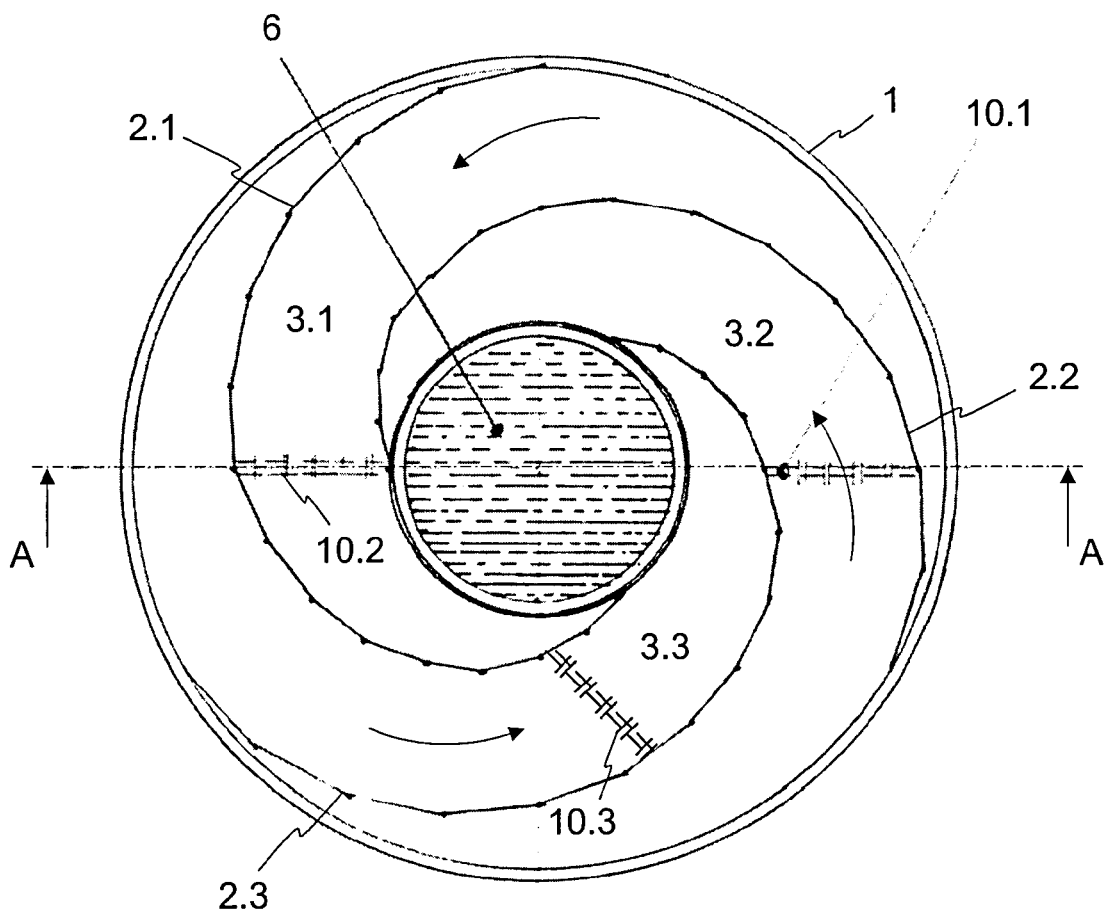
FIG. 5 shows the second embodiment of the water filter according to the invention in the top view in opened state.
Figure 6:
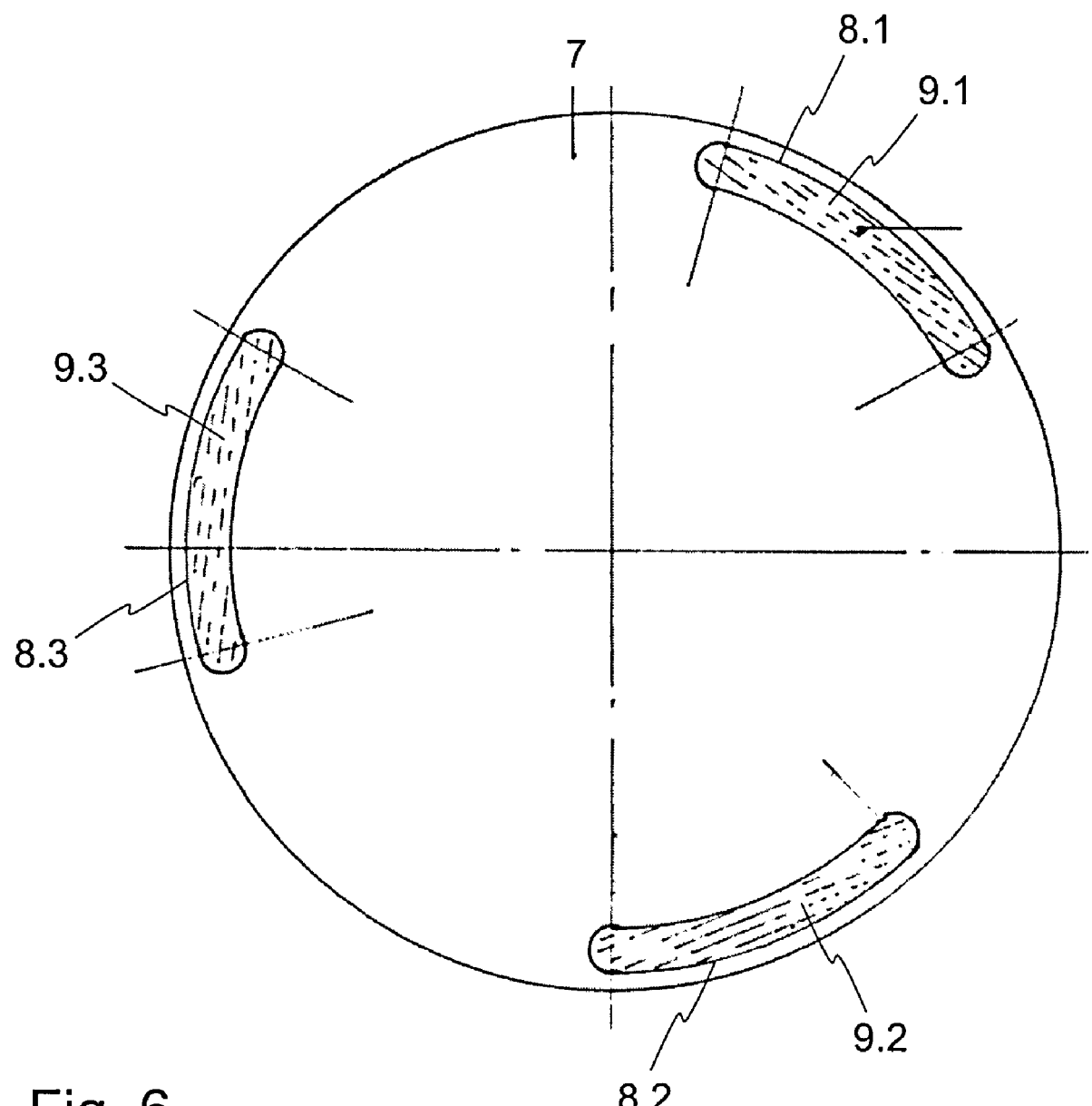
FIG. 6 shows the second embodiment of the water filter according to the invention in the top view with cover.

A second embodiment of the water filter according to the invention is shown in the cross-section and in the top view in opened state in the FIGS. 4 and 5. The cross-section shown in FIG. 4 is a cut along the cutting line A-A, which is shown in FIG. 5. The associated cover 7 is shown in FIG. 6. The second embodiment presented in the FIGS. 4 and 5 differs from the first embodiment in that several ribs 10.1 are provided in the container 1 between the channel walls 2.2 and 2.3. Moreover, several ribs 10.2 are arranged between the channel walls 2.1 and 2.2. Ribs 10.3 are also located between the channel walls 2.1 and 2.3. The ribs 10.1, 10.2 and 10.3 are moulded-on at the bottom 4 of the container 1. With the help of the ribs 10.1 and 10.2 the granulated filter material 11 is prevented from getting washed away by the flow of the water and from accumulating near the outlet 5. The flow of the water is represented in FIG. 5 with arrows. If the filter material 11 has accumulated over the entire cross-section of the channel and swells up in wet state, the density rises in this area in the channel and the flow resistance increases. The ribs 10.1 and 10.2 ensure that the granulated filter material 11 remains evenly distributed in the channels 3.1 to 3.3 over the operating time of the water filter. As a result the transit time of the water remains constant over a long period of time and a clogging of the channel or the channels, as the case may be, is avoided. For the rest, the second embodiment corresponds to the first embodiment.

The ribs 10.1 and 10.2 can have the form of a comb or can be developed as sills, slits, bridges or being nose-shaped. Alternatively they can be moulded-on on the bottom 4 or on the cover 7 or be inserted into the channels 3.1 to 3.3. The number of the ribs 10.1 and 10.2 depends, among other things, upon the granularity of the filter material 11, upon the number of the channels as well as upon the quantity and flow speed of the water.

Figure 7:
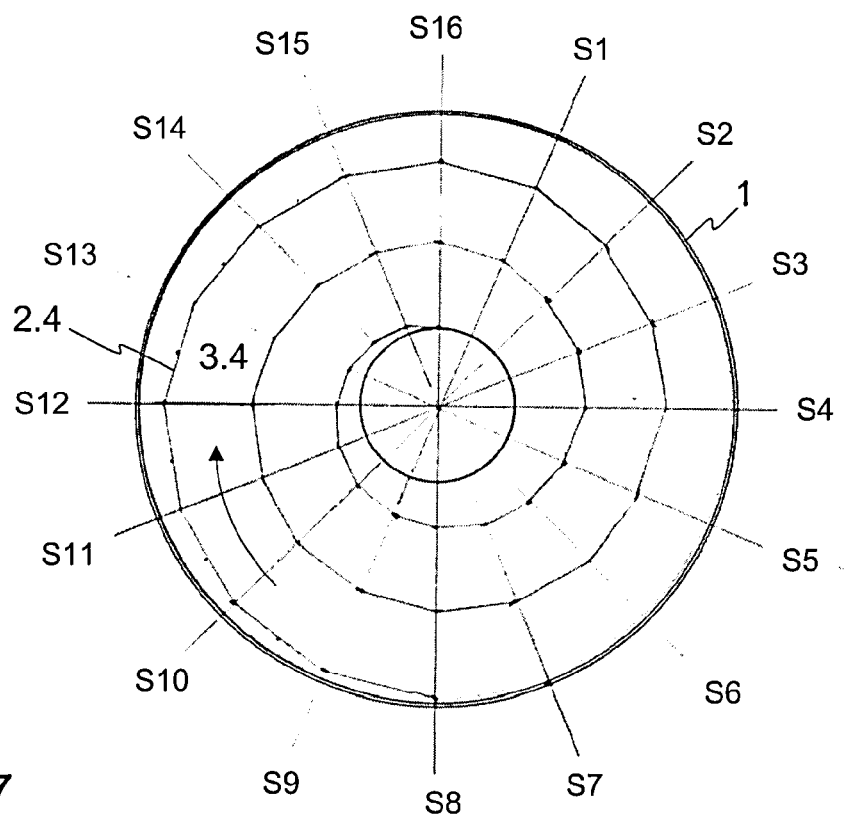
FIG. 7 shows a third embodiment of the water filter according to the invention in the top view in opened state.

A third embodiment of the water filter according to the invention in the top view in the opened state is shown in FIG. 7. The third embodiment differs from the first and the second embodiment in that only one spiral channel wall 2.4 is provided in the container 1, so that also only one channel 3.4 is developed. The third embodiment has the advantage that the filling of the container 1 with the granulated filter material 11 is simple. Moreover, the utilisation of the available area is high.

Figure 8:
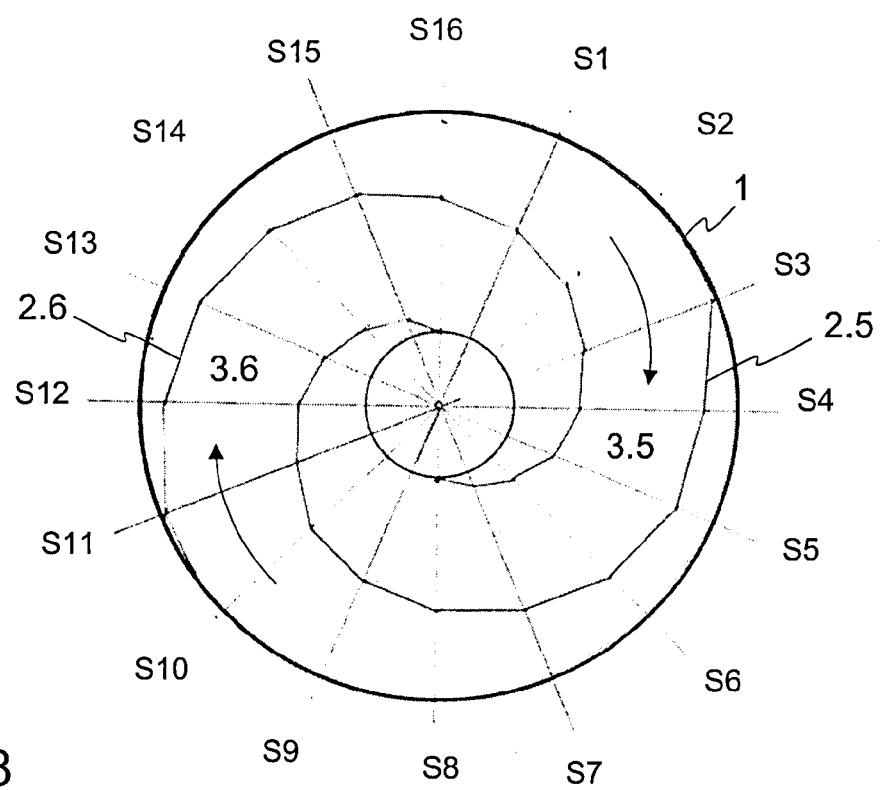
FIG. 8 shows a fourth embodiment of the water filter according to the invention in the top view in opened state.

FIG. 8 shows the fourth embodiment of the water filter according to the invention in the top view in the opened state. The fourth embodiment differs from the previous embodiments in that two spiral channel walls 2.5 and 2.6, which form two channels 3.5 and 3.6, are provided in the container 1. The fourth embodiment has the advantage that the granulated filter material 11 remains equally distributed in the water filter over a longer period of time.

The reference symbols S1 to S16 mark individual segments and are used for making the distinctions between the individual embodiments more clearly identifiable.

Figure 9:
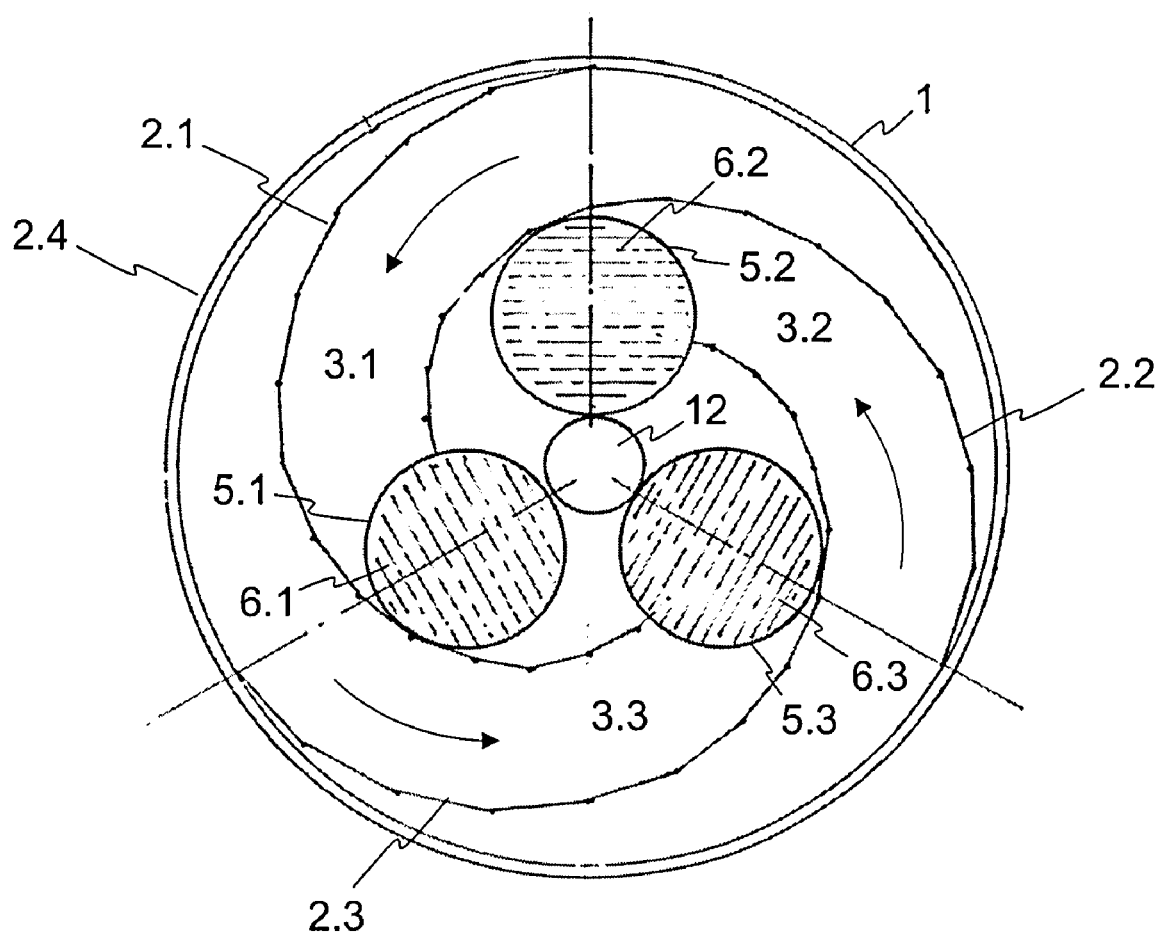
FIG. 9 shows the fifth embodiment of the water filter according to the invention in the top view in opened state.

FIG. 9 shows a fifth embodiment of the water filter according to the invention in the top view in the opened state. The embodiment shown in FIG. 9 differs from the abovementioned embodiment in that three outlets 5.1, 5.2 and 5.3 are provided, in which respectively one sieve 6.1, 6.2 and 6.3 is arranged on the outlet side, so that an individual outlet is available for each channel 3.1 to 3.3 respectively. Consequently, the channel 3.1 leads into the outlet 5.1 with the sieve 6.1, the channel 3.2 into the outlet 5.2 with the sieve 6.2 and the channel 3.3 into the outlet 5.3 with the sieve 6.3. With the help of a connection piece or a dividing wall 12 the individual chambers or channels 3.1, 3.2 and 3.3 are separated from each other in the centre of the water filter.

The channel walls can, as shown in the FIGS. from 1 to 8, be moulded as polygons. However, they can also be moulded in round shape.

The transit time of the water is the shortest in the case of the first and second embodiments (FIGS. 1 to 6) and the longest in the case of the third embodiment shown in FIG. 7. In the case of the embodiment according to FIG. 8 the transit time is situated in between.

The transit time can be influenced by the size and shape of the inlets from 8.1 to 8.3 and of the outlet 5 as well as by the grain size of the filter-material 11 in the case of the described embodiments.

The diameter of the water filter depends on the basic technical conditions. In an embodiment the diameter is situated at 11 cm.

It is possible to insert the water filters in horizontal position using the adaptation of the water filter shown in the FIGS. from 1 to 8.

The water filter can be used for example in household appliances and household machines, such as coffee maker, tea machine or soft drink maker, juice extractors, laundry irons, dishwashers, washing machines, water purification apparatuses and water dispensers, in air humidifiers and air purifiers. The water filter can be used in gastronomy field and also in private households.

The preceding description of the embodiments according to the present invention is used only for illustrative purposes and not for the purpose of restricting the invention. Different alterations and modifications are possible within the framework of the invention without leaving the scope of the invention and its equivalents.

LIST OF REFERENCE SYMBOLS

1 Container
2.1-2.6 Channel walls
3.1-3.6 Channels
4 Bottom
5 Outlet
5.1-5.3 Outlets
6 Sieve on the outlet side
6.1-6.3 Sieve on the outlet side
7 Cover
8.1 Inlet
8.2 Inlet
8.3 Inlet
9.1 Sieve on the inlet side
9.2 Sieve on the inlet side
9.3 Sieve on the inlet side
10.1 Ribs
10.2 Ribs
10.3 Ribs
11 Filter material
12 Dividing wall
S1-S16 Segment Number 1 to 16

The invention claimed is:

1. A water filter, comprising:
a container, which has a generally vertical sidewall, a bottom and a cover;
wherein several water inlets are provided in the cover,
wherein at least one water outlet is provided in the bottom,
wherein a plurality of generally vertical spiral walls defining spiral channels are provided in the container, through which the water inlets are connected to the water outlet,
wherein granulated filter material is located in the channels, and
wherein a plurality ribs are provided within each channel extending generally vertically from the bottom to the cover, wherein each plurality of ribs forms a comb extending across the respective channel for retaining the filter material within the respective channel.

2. A water filter according to claim 1,
wherein each of the channels connects respectively one of the inlets to the outlet.

3. A water filter according to claim 1,
wherein each of the channels connects respectively one of the inlets to respectively one of the outlets.

4. A water filter according to claim 1,
wherein the inlets and the outlet have respectively one sieve for retaining the filter material.

5. A water filter according to claim 1,
wherein the inlets are equidistantly distributed in relation to each other.

6. A water filter according to claim 1,
wherein the cover has an outer edge and the inlets are arranged radially inward from and in close proximity to the outer edge of the cover.

7. A water filter according to claim 1,
wherein the bottom has a slope.

8. A water filter according to claim 1,
wherein the cover is flat.

9. A water filter according to claim 1,
wherein the cover is welded on to the container.

10. A water filter according to claim 1,
wherein the container is cylindrically shaped.

11. A method of filtering water, said method comprising flowing water through the water filter according to claim 1, wherein the water filter is contained a household appliance selected from the group consisting of a coffee maker, tea machine, soft drink maker, a juice extractor, a laundry iron, a dishwasher, a washing machine, a water dispenser, a water purification apparatus, an air humidifier and an air purifier.

* * * * *